United States Patent Office 2,857,306
Patented Oct. 21, 1958

2,857,306

INSECTICIDAL MATERIALS

Earl W. Gluesenkamp, Gail H. Birum, and William E. Weesner, Dayton, Ohio, assignors to Monsanto Chemical Company, St. Louis, Mo., a corporation of Delaware No Drawing. Application April 18, 1956
Serial No. 578,862

30 Claims. (Cl. 167—22)

This invention relates to insecticidal materials made by reacting phosphite esters with products derived by chlorination of trithiane.

Trithiane is a trimer of the sulfur analogue of formaldehyde, having the formula $(-CH_2S-)_3$, i. e.,

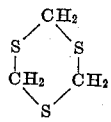

The literature reports the chlorination of trithiane with a variety of chlorinating agents, such as chlorine, sulfuryl chloride, thionyl chloride, sulfur monochloride and sulfur dichloride, etc. Apparently the first step in the chlorination process is the cleavage of the trithiane ring. The chlorination products which have been isolated and identified include chloromethyl sulfides and disulfides and sulfenyl chlorides; in aqueous solution, sulfones are reported to be formed. Exhaustive chlorination may replace all of the hydrogen atoms present in the reaction mixture. However, no complete investigation of the complex reaction mixture appears to have been published and the precise nature of this chlorination product remains indeterminate at the present date.

In accordance with the present invention, the complex reaction mixture which is the product of chlorination of trithiane under substantially anhydrous conditions to introduce from one to three moles of molecular chlorine per mole of trithiane into the chlorination product is reacted with an alkyl or haloalkyl ester of a phosphorous acid.

We have made the discovery that the chlorine- and sulfur-containing reaction mixture produced by such chlorination of trithiane will react with phosphite esters to produce complex insecticidal reaction mixtures containing phosphorous and sulfur. The reaction with the phosphorous acid ester may be carried out under varied conditions and with proportions of chlorinated trithiane to phosphorous acid ester up to those producing complete replacement of all the chlorine present in the reaction mixture.

The phosphorous acid esters useful in the present process are those of the formula $(RO)_2PXR'$ where R is selected from alkyl and haloalkyl radicals, R' is selected from R and alkali metals, and X is an atom of a non-metallic element of group 6A having an atomic weight below 40, i. e., X is oxygen or sulfur. One class of phosphite esters of the above formula are trialkyl phosphites, wherein R and R' are alkyl and X is oxygen, e. g., trimethyl phosphite, triethyl phosphite, tri-n-propyl phosphite, triisopropyl phosphite, triisoamyl phosphite, trihexyl phosphite, tris(2-ethylhexyl) phosphite, trinonyl phosphite, tri-tert-dodecyl phosphite, tris(2-butyloctyl) phosphite, tri-tridecyl phosphite, trihexadecyl phosphite, diethyl propyl phosphite, amyl dimethyl phosphite, dibutyl dodecyl phosphite, diheptyl methyl phosphite, butyl ethyl propyl phosphite, etc. Other phosphites useful in the present process are those in which at least one of R or R' in the above formula is haloalkyl, such as tris(2-chloroethyl) phosphite, bis(2-chloroethyl) ethyl phosphite, bis(2-chloroethyl) methyl phosphite, 4-chlorobutyl diethyl phosphite, tris(2-bromoethyl) phosphite, bis(2-bromoethyl) n-butyl phosphite, tris(2-chloropropyl) phosphite, tris(2,2,2-trichloroethyl) phosphite, etc.; and those in which R and R' are alkyl or haloalkyl and X is sulfur, such as triethyl phosphorothioite, tris(2-chloroethyl) phosphorothioite, triisobutyl phosphorothioite, S-ethyl O,O-di-n-propyl phosphorothioite, etc.

Instead of triesters of phosphorous acid, there may alternatively be employed in the reaction with chlorinated trithiane, alkali metal salts of diesters of phosphorous and phosphorothioous acid, i. e., the phosphorous acid esters of the above formula where R' is an alkali metal. Both phosphites in which the X of the above formula is oxygen, and phosphorothioites, in which X in the above formula represents sulfur, are readily available in the form of the diester alkali metal salts. As examples of dialkyl phosphite and phosphorothioite salts useful in the present process may be listed sodium dimethyl phosphite, sodium di-n-butyl phosphite, potassium diethyl phosphite, potassium amyl dodecyl phosphite, sodium dihexyl phosphite, potassium bis(2-ethylhexyl) phosphite, lithium diethyl phosphite; sodium O,O-dimethyl phosphorothioite, sodium O,O-diethyl phosphorothioite, sodium O,O-diisopropyl phosphorothioite, potassium O,O-diethyl phosphorothioite, sodium O,O-dioctyl phosphorothioite, etc. Salts of phosphorothious and phosphorous acid bis(haloalkyl) and mixed alkyl haloalkyl esters which may be reacted with chlorinated trithiane in accordance with the invention include sodium bis(chloroethyl) phosphite, sodium bis(2-chloropropyl) phosphite, sodium 2-chloroethyl ethyl phosphite, sodium O,O-bis(2-chloroethyl) phosphorothioite, sodium O,O-bis(2-chloropropyl) phosphorothioite, etc.

As explained above, the composition of the reaction mixture obtained by chlorinating trithiane under the presently specified conditions—i. e., in a substantially anhydrous medium and to an extent so as to introduce from one to three moles of chlorine per mole of trithiane— is not fully understood at the present time. It is, therefore, not possible to define by structural formula the insecticidal materials obtained by reaction with phosphite esters as afforded by the process of this invention. At least some of the chlorine in the trithiane chlorination product is known to be attached to carbon atoms; it is also known that phosphorous acid esters react with organic halides with rearrangement to give phosphonates, an alkyl halide, alkylene dihalide, or alkali metal halide, depending upon the phosphite ester or ester salt reacted, being formed as the byproduct of this reaction. Since such formation of, for example, alkyl halides has been observed in the present process, probably phosphonates are among the components of the present insecticidal reaction product. We surmise, although proof thereof is lacking and we do not wish to be limited in this invention by the speculation, that at least one of the active ingredients in the reaction mixture is a (dithiodimethylene)diphosphonate ester formed by reaction of bis(chloromethyl) disulfide with the phosphite. The new compounds (dithiodimethylene)diphosphonate esters, and the insecticidal properties thereof are disclosed in a copending application by one of the present inventors, Gail H. Birum, Serial No. 470,788, filed November 23, 1954, of common assignment herewith.

However, the activity of the present reaction products as insecticides is two or more times that which might be accounted for by the theoretical formation of (dithiodimethylene)diphosphonate esters. Furthermore, the amount of alkyl halide formed in the reaction of phosphites with chlorinated trithiane is usually less than theoretically calculated for phosphonate formation, and it is apparent that other reactions occur. Thus, for example, phosphites may react with any sulfenyl halides present in the trithiane chlorination product to form thiophosphates; phosphites may also react with disulfide linkages, cleaving the S—S bonds to produce thiophosphates, etc. While most of the components of the trithiane chlorination product which have been identified to date have been distillable materials, we have made the discovery that phosphites, as well as reacting with the distillable trithiane chlorination products, also react with the undistillable residue from the chlorination of trithiane, which contains unidentified products, and that this complex reaction product, which consists of a mixture of compounds derived from the chlorination residue, is also an active insecticidal material. Thus the present insecticidal materials are probably mixtures of compounds, the composition of which is best defined with reference to the process of manufacture.

In carrying out the process of the invention, there may be used trithiane which has been chlorinated by reaction with any of a variety of chlorinating agents effective to produce cleavage of the trithiane ring and replacement of hydrogen atoms attached to carbon atoms. Preferably, inorganic sulfur-containing chlorinating agents are used for the chlorination of trithiane; examples of these chlorinating agents are sulfur monochloride, sulfur dichloride, thionyl chloride and sulfuryl chloride. Alternatively, if desired, there may be used for the preparation of the chlorinated trithiane which is to be reacted with a phosphite in accordance with this invention, either liquid or gaseous chlorine. Mixtures of two or more of the above chlorinating agents are also useful in the chlorination of trithiane. To avoid the formation of sulfonyl chlorides or sulfones, as mentioned above, the chlorination should be carried on under substantially anhydrous conditions. For reaction with phosphites in accordance with this invention to produce insecticidally active materials, the preferred trithiane chlorination products are those in which from one to three moles of chlorine have been introduced into the reaction products per mole of trithiane used; by moles of chlorine per mole of trithiane is here meant moles of molecular chlorine, i. e., of $Cl_2$, per mole of $(-CH_2S-)_3$. Thus, for example, from one to three moles of sulfuryl chloride may be reacted with one mole of trithiane, there being two molecules of chlorine present in each sulfurylchloride molecule. Reaction of one mole of sulfuryl chloride with one mole of trithiane will then introduce two chlorine atoms per three $-CH_2S-$ fragments in each atom of trithiane, while reaction of three moles of a chlorinating agent such as $SO_2Cl_2$ (sulfuryl chloride), $S_2Cl_2$ (sulfur monochloride) or $Cl_2$ (chlorine), etc., with one mole of trithiane would introduce six atoms of chlorine per three $-CH_2S-$ fragments present in one trithiane atom. Probably the chlorination products include compounds varying from unchlorinated or only mono-chlorinated products to perchlorinated sulfur-containing compounds such as perchloromethyl mercaptan and bis(trichloromethyl) sulfide, with all gradations between these stages being present in different degrees.

It is a further aspect of the present invention to react with the phosphite esters herein disclosed as useful in the preparation of insecticidal materials, either the entire trithiane chlorination product, or the fraction thereof which is distillable, or the fraction thereof which is non-distillable. (By non-distillable is here meant material which does not distill without degradation under usual laboratory or chemical plant vacuum distillation conditions, i. e., down to about 0.05 mm., it being recognized that special techniques such as molecular distillation may possibly be applied in unusual circumstances for the successful separation of high boiling materials which are for practical purposes non-distillable). The products of reaction of phosphites with the total chlorination product, the distillable fraction thereof, and the undistillable chlorination residue vary somewhat in effectiveness, but are all insecticidal.

In carrying out the present process, the trithiane chlorination product made by chlorinating trithiane under anhydrous conditions so as to introduce from one to three moles of chlorine per mole of trithiane into the chlorination product is contacted with a phosphite ester of the formula $(RO)_2PXR'$ where R represents an alkyl or haloalkyl radical, R' is selected from R and an alkali metal and X is oxygen or sulfur. Obviously, if desired, the chlorinated trithiane may be contacted with two or more different phosphite esters simultaneously or one after the other, so as to form mixed reaction products containing phosphorus atoms to which different ester radicals are attached, and such variation of the present process is also included in the scope of the present invention.

The amount of phosphite necessary to be reacted with the trithiane chlorination product to produce insecticidal materials may vary considerably, ranging from as low as one-tenth to one-twentieth of the mole equivalent of the chlorine present in the distillable portion of the trithiane chlorination product, up to sufficient phosphite ester to replace all of the chlorine present in the trithiane chlorination product. Generally, it is preferred to react the trithiane chlorination product with at least sufficient phosphite ester to change the refractive index of the reaction mixture, the change in refractive index being a measure of the extent of reaction. Thus, for example, the refractive index of trithiane chlorinated under the presently specified conditions is of the order of 1.57 to 1.60, and fractionation of the trithiane chlorination product produces lower boiling distillable products which may have refractive indexes of below 1.55, down to, say, 1.52 to 1.53, the higher boiling materials having higher refractive indexes. In carrying out the present process, it is possible, for example, to react the chlorinated trithiane with sufficient phosphite ester to reduce the refractive index of the reaction mixture by approximately 0.10, thus, for example, producing reaction products having refractive indexes of down to about 1.45, and typically 1.47 to 1.50, though these values may vary from the above given figures, depending on the reactants, the proportions thereof, and the reaction conditions, and are not to be construed as critical.

Another measure of the reaction of the trithiane chlorination product with phosphites which may be used to gauge the extent of formation of insecticidal reaction products is the heat of reaction. The reaction of phosphites with trithiane chlorination products appears to be generally exothermic. It has been found that the heat of this reaction is a convenient measure of the production of a minimum of the desired phosphorus-containing products of this invention. For example, in a preferred mode of operation of the present reaction, a phosphite is added to the trithiane chlorination product until further addition of phosphite no longer produces exothermal heat of reaction. This modification of the conditions of the present reaction is particularly applicable, for example, to the embodiment of the present application which consists of chlorinating trithiane and isolating the chlorination product which distills without degradation under vacuum down to say, 0.1–1.0 mm., phosphite esters subsequently being added to the distillation product at room temperature or below until evolution of heat ceases. The reaction mixture may then be heated to complete the reaction. When it is desired to produce complete replacement of the chlorine in the trithiane chlorination product, on the other hand, the addition of phosphite ester to the trithiane chlorination product may be continued after cessation of evolution of heat, and the reaction mixture heated at up to below the decomposition temperatures of the reaction components until after completion of the replacement of chlorine is signalized by the cessation of formation of halide byproducts.

If desired, inert solvents or diluents may be present in the reaction mixture of the chlorinated trithiane and phosphite. Thus, for example, trithiane may be mixed with a solvent prior to chlorination and the resulting chlorination product solution may be reacted with the phosphite ester directly. Alternatively, solvents or diluents such as benzene, hexane, etc., may be added to the reaction mixture, or the reactants may be dissolved in such solvents before mixing, e. g., to facilitate control of the reaction. Generally, however, the reaction can be carried out directly, in the absence of extraneous liquids, without difficulty and, to avoid dilution of the insecticidally active products and the necessity for concentration thereof, direct reaction will be preferred. Furthermore, the reaction rate may, if desired, be enhanced by pressure variation or by the addition of catalysts, but generally the process proceeds readily without such accelerating means.

The invention is illustrated but not limited by the following examples, wherein all temperatures are given in ° C.

I. CHLORINATION OF TRITHIANE

A. With chlorine and thionyl chloride

*Example 1.*—To a flask containing 254 g. (1.84 moles) of trithiane in 200 ml. of methylene dichloride at 0° C. were added 329 g. (2.76 moles) of thionyl chloride. The mixture was then cooled to below −20°, and chlorine was passed in through an inlet tube extending above the liquid surface over a period of one and a quarter hours. A total of 131 g. (1.84 moles) of chlorine was introduced in this fashion. After addition of chlorine was complete, the mixture was gradually warmed, with evolution of HCl occurring. After being held at 40–67° for 16 hours, the mixture was distilled to remove methylene chloride, and the concentrated reaction mixture was then heated at 90–120° for an additional three hours. Distillation of the reaction mixture to remove material boiling up to 60°/30 mm. (pot temperature 77°) took off some 10 to 15 g. of distillate, leaving 434 g. of red-brown liquid reaction product, $n_D^{25}$ 1.6099. A portion of this reaction product was distilled, whereby there were obtained 127.5 g. of brown liquid residue boiling above 105°/2 mm. (pot temperature 132°) and 246 g. of yellow distillate, $n_D^{25}$ 1.5569. Fractionation of part of the distillate yielded 123.8 g. of bis(chloromethyl) sulfide, $n_D^{25}$ 1.53, b. 41–43°/10 mm., and 44.1 g. of bis(chloromethyl) disulfide, $n_D^{25}$ 1.5859, b. 58–59°/2–1.5 mm. Accordingly, this chlorination procedure produced a yield of approximately 13.6% bis(chloromethyl) disulfide calculated on the trithiane. The remainder of the reaction product consisted of bis(chloromethyl) monosulfide and other unidentified material.

B. With thionyl chloride

*Example 2.*—A mixture of 966 g. (7 moles) of trithiane and 1666 g. (14 moles) of thionyl chloride was placed in a three-liter four-necked flask provided with a stirrer, thermometer and condenser. The reaction mixture was heated gradually over a period of about thirty hours to a final temperature of 131° C. After removal of 98.5 g. of material boiling up to 74°/50 mm., the reaction product was fractionated, to yield 1130.5 g. of orange liquid boiling at from 74°/50 mm. to 95°/0.5 mm. and containing 31% sulfur and 50% chlorine. There remained in the flask 630 g. of black residue which was found by analysis to contain 65% sulfur and 24% chlorine.

C. With sulfuryl chloride

*Example 3.*—To a mixture of 414 g. (3 moles) of trithiane and 500 cc. of carbon tetrachloride, cooled in ice, was added 810 g. (6 moles) of sulfuryl chloride, over a period of three-quarters of an hour, while the temperature of the reaction mixture was maintained at 2 to 10° C. When the addition was complete, the reaction mixture was heated at 80° for two hours and at 130–135° for half an hour, and finally the temperature was raised to 147° to complete the reaction. There was obtained 764.5 g. of black viscous liquid product. A portion of the reaction mixture was distilled to remove material boiling up to 124°/1 mm. (pot temperature 143°), giving 525 g. of yellow distillate, and 129 g. of black liquid residue which was found by analysis to contain 4% carbon 4.7% hydrogen, 29% chlorine and 61% sulfur.

*Example 4.*—A total of 1656 g. (12 moles) of trithiane was reacted with 3240 g. (24 moles) of sulfuryl chloride, the first portion of the reaction being carried out with 414 g. of trithiane in 500 ml. of carbon tetrachloride treated with 450 g. of sulfuryl chloride as described in the above example, and additional trithiane and sulfuryl chloride being added alternately until the total amount of reactants had been added to the reaction vessel. During the addition, the temperature of the reaction mixture was maintained at below 10° C. To complete the reaction, the total reaction mixture was warmed to 100° over a period of an hour and a half, and the carbon tetrachloride solvent was removed by distillation as the pot temperature was increased to 140° in two and a half more hours. A portion of the reaction product, $n_D^{25}$ 1.5886, was distilled, 2110 g. of yellow distillate being obtained at up to 131°/5 mm. The distillate contained 53% chlorine and 28% sulfur. The distillation residue from this step weighed 654 g. and was found to contain 32.7% chlorine and 57% sulfur.

II. REACTION WITH PHOSPHORUS ACID ESTERS

A. Entire reaction mixture

*Example 5.*—This example illustrates the reaction of a trialkyl phosphite with the total unfractionated product of chlorination of trithiane with sulfuryl chloride.

A 51 g. sample of the total chlorination product obtained as described in Example 3, by chlorination of trithiane with sulfuryl chloride, was placed in a flask and cooled in ice. Trimethyl phosphite was added to the chlorinated trithiane, while the temperature of the reaction mixture was held at below 31°, until the dropwise addition of the phosphite no longer produced a temperature rise. The addition required about twenty minutes and consumed 50 g. (0.4 mole) of trimethyl phosphite. The reaction mixture was then refluxed under vacuum (maximum temperature 64°) for ten or fifteen minutes, the volatile distillate being collected. This distillate weighed 16.4 g. and consisted essentially of methyl chloride. The red-brown reaction mixture, $n_D^{25}$ 1.4936, weighed 84.6 g. and was found by analysis to contain 18.98% chlorine, 12.66% phosphorus, and 20.97% sulfur.

B. Distillation residue

*Example 6.*—This example illustrates the reaction of a trialkyl phosphite with the undistillable residue remaining from fractionation of the product of chlorination of trithiane with sulfuryl chloride.

A 50 g. portion of the black liquid residue from distillation of the trithiane chlorination product as described in Example 3 (containing 4% carbon, 29% chlorine and 61% sulfur) was placed in a flask and cooled in ice-water. To this chlorination residue was added trimethyl phosphite, with intermittent cooling, until the exothermal reaction ceased. A total of 100.5 g. (0.81 mole) of trimethyl phosphite was consumed. The reaction mixture was warmed to 70°, and then heated at 72° under vacuum. It was allowed to cool to room temperature and filtered, to yield 131.5 g. of black reaction product, $n_D^{25}$ 1.4742.

C. Chlorination product distillate

*Example 7.*—This example describes the reaction of a trialkyl phosphite with the distillate from chlorination of trithiane with a mixture of chlorine and thionyl chloride, high temperatures being employed to produce and complete replacement of chlorine in the trithiane chlorination product.

A 26.2 g. portion of the yellow distillate obtained as described in Example 1 was placed in a 500 ml. four-necked flask provided with stirrer, thermometer, dropping funnel, and a condenser connected to a Dry-Ice trap. The flask was cooled at the temperature of melting ice and 99.6 g. (0.6 mole) of triethyl phosphite was added to the flask over a period of three-quarters of an hour, with intermittent cooling to hold the temperature at below about 10° C. On completion of the addition, the cloudy reaction mixture was warmed to 20°, about 0.5 g. of sodium iodide was added as a catalyst, and the mixture was warmed to about 120° for half an hour. A few ml. of colorless liquid collected in the Dry-Ice trap on the condenser. After standing overnight at room temperature, the mixture was again warmed to 150–192° for three hours, the distillate again being collected in the Dry-Ice trap. A total of 18 g. of ethyl chloride was collected. The reaction product was then distilled to remove material boiling up to about 60°/2 mm., and there was obtained 58.5 g. of light yellow liquid residue, $n_D^{25}$ 1.4728, which was found by analysis to contain 11.42% sulfur and 17.62% phosphorus, and to be free of chlorine.

*Example 8.*—The above example illustrates the complete replacement of chlorine in the trithiane chlorination product distillate, by reaction with a trialkyl phosphite at a high temperature. This example illustrates the partial replacement of chlorine in the distillable fraction of the trithiane chlorination product, utilizing triethyl phosphite and trimethyl phosphite. At the temperatures of this experiment, the chlorine of bis(chloromethyl) monosulfide, for example, is unreactive towards trialkyl phosphites.

A 108 g. portion of the orange distillate from the chlorination of trithiane with thionyl chloride as described in Example 2 was placed in a reaction flask and cooled in ice. Trimethyl phosphite was added gradually to the chlorination product over a period of half an hour with intermittent cooling; this required 62.0 g. (0.5 mole) of the trimethyl phosphite, before the addition no longer produced an exothermal reaction. The mixture was warmed to about 65° and then warmed under vacuum to a pot temperature of 52°, while methyl chloride was collected in a trap attached to a condenser on the flask. The total weight loss during the reaction was 18.2 g. The clear yellow product weighed 151.8 g. and was found by analysis to contain 28.07% chlorine, 9.91% phosphorus and 22.7% sulfur. After standing overnight, the yellow liquid product was stirred with a commercial filter aid and filtered, to remove a small amount of gelatinous material which separated. The clarified material was found to have a refractive index ($n_D^{27}$) of 1.5018.

Similarly, a 108 g. portion of the distillate from trithiane chlorination as described in Example 2 was reacted with 87 g. (0.524 mole) of triethyl phosphite, the addition requiring about three-quarters of an hour. After removal of ethyl chloride (about 21.5 g. was collected in the condenser Dry-Ice trap), there was obtained a light yellow cloudy product, which was treated with a filter aid to give a clear yellow filtrate, $n_D^{27}$ 1.4852, weighing 172.7 g. The product was found by analysis to contain 25.08% chlorine, 9% phosphorus, and 18.89% sulfur.

*Example 9.*—This example illustrates the reaction of triethyl phosphite with the distillate from the chlorination of trithiane with sulfuryl chloride.

A 75 g. portion of the yellow distillate obtained by chlorination of trithiane as described in Example 3 was placed in a reaction flask and cooled in ice. Freshly distilled triethyl phosphite was added to the flask, with intermittent cooling, until there was no longer an exothermal reaction on further addition. This required 70.8 g. (0.427 mole) of triethyl phosphite. The orange reaction mixture was then warmed to 63°, cooled to 40°, and then refluxed under a low vacuum at a maximum temperature of 68° for about 20 minutes. The yellow product, $n_D^{25}$ 1.4883, weighed 126.7 g.; this represents a weight loss of 19.1 g. The reaction product remained clear on standing. It was found by analysis to contain 22.62% chlorine, 9.02% phosphorus and 17.97% sulfur.

*Example 10.*—This example again illustrates the reaction of trialkyl phosphites with the trithiane chlorination product distillate produced by using sulfuryl chloride as the chlorinating agent.

One thousand grams of the trithiane chlorination product distillate prepared as described in Example 4 was reacted with 781 g. (4.7 moles) of triethyl phosphite, with cooling until the addition was complete, and then subsequent heating to complete the reaction. After refluxing under vacuum at 69° for three-quarters of an hour, the orange liquid product weighed 1534 g., the loss of weight being 247 g. The orange liquid product, $n_D^{25}$ 1.4928, $d_4^{20}$ 1.284, was found by analysis to contain 24.71% chlorine, 7.77% phosphorus, and 18.49% sulfur.

Similarly, 1100 g. of the yellow distillate of Example 4 was reacted with 642 g. (5.2 moles) of trimethyl phosphite, the subsequent reflux temperature being about 70° C. There were obtained 1474 g. of orange liquid product, $n_D^{25}$ 1.5077, $d_4^{20}$ 1.394, containing 27.74% chlorine, 8.37% phosphorus, and 20.87% sulfur.

D. Reaction of mixed phosphites with the chlorination product distillate

*Example 11.*—This example illustrates the reaction of the trithiane chlorination product distillate, made using sulfuryl chloride as the chlorinating agent, with two different phosphite esters, added sequentially, and also illustrates the formation of the novel products of this invention using a haloalkyl phosphite.

To 75 g. of the yellow distillate prepared as described in Example 3, cooled to −10° in a Dry-Ice bath, were added 26.5 g. (0.214 mole) of trimethyl phosphite, over 20 minutes, with intermittent cooling. The reaction mixture was then allowed to warm to room temperature and 57.5 g. (0.214 mole) of tris(2-chloroethyl) phosphite were added, slowly, with cooling to keep the temperature at 26 to 31° C. The exothermal reaction raised the reaction temperature to 40° after addition of the phosphite was complete. The reaction mixture was warmed to 83°, cooled to 40°, and then refluxed under a low vacuum at 76° for about 20 minutes, to remove volatile byproducts, i. e., methyl chloride and ethylene dichloride. There was obtained 133.2 g. of yellow product. Fractionation of 75 g. of this yellow product, by vacuum distillation in a Todd column with a 12 mm. Vigreux tube, separated the reaction product into 18.4 g. of bis(chloromethyl) monosulfide, b. 49–56°/10 mm.; 7.3 g. of material boiling at from 56 to 68°/10 mm., and 47.3 g. of orange liquid residue.

E. Reaction of an alkali metal phosphite salt with the chlorination product distillate

*Example 12.*—This example describes the reaction of an alkali metal salt of a dialykyl phosphite ester with a trithiane chlorination product distillate prepared using thionyl chloride as the chlorinating agent.

For the preparation of sodium diethyl phosphite, 13 g. of sodium was introduced into 300 ml. of benzene in a one-liter flask. The benzene was warmed to reflux and 69 g. (0.5 mole) of freshly distilled diethyl phosphite was added over a period of about ten minutes. The mixture was refluxed for two hours, unreacted sodium was removed, and the resulting solution was cooled in the Dry-Ice bath. A total of 75 g. of the chlorinated trithiane distillate prepared as described in Example 2 was then introduced into the reaction mixture during about 20 minutes, while the temperature of the reaction mixture was maintained at −5° to +5° by cooling. When all of the trithiane chlorination distillate had been added, the reaction mixture was warmed to 60° to give a clear yellow solution. It was then cooled to 5° and 10 g. of water was added to precipitate any sodium chloride present. The benzene solution was decanted from a white gelatinous precipitate which formed, and subjected to distillation to remove the benzene. There were obtained 99.4 g. of red liquid residue.

The products of this invention have been found to be active as biological toxicants, being especially effective as insecticides. Thus, for example, the chlorine-free product of Example 7 produced 100% kill of fifth instar large milkweed bug nymphs when applied topically in acetone solution. As mentioned above, it is known in the art that bis(chloromethyl) disulfide may be present in the distillable portion of the trithiane chlorination product prepared under the presently specified conditions. Our experiments have produced distillates containing approximately one-fourth by weight bis(chloromethyl) disulfide. The present reaction of the trithiane chlorination product with a phosphite ester may then, among other products, produce a (dithiodimethylene)diphosphonate ester. (Dithiodimethylene)diphosphonate esters are unusually effective insecticides, as disclosed in the aforementioned copending application Serial No. 470,788, filed November 23, 1954. Accordingly, it was of interest to determine to what extent the insecticidal properties of the present reaction product were functions of the (dithiodimethylene)diphosphonate ester content.

By calculation and analysis it was established that the reaction product derived from the reaction of phosphites with the distillable portion of the trithiane chlorination product may contain at most 25% (dithiodimethylene)diphosphonate. Thus, as described in Example 1, there were 44.1 g. of bis(chloromethyl) disulfide present in 196 g. of distillable material, or about one-fourth or 25% by weight of the distillable material was bis(chloromethyl) disulfide. In repeated experiments with other chlorinating agents as herein disclosed, we have consistently obtained the same results, i. e., maximum yields of bis(chloromethyl) disulfide which are below 15% of theoretical based on trithiane charged into the chlorination, the bis(chloromethyl) disulfide constituting about 25% of the distillable material. Thus, for example, chlorination of trithiane with thionyl chloride gave a bis(chloromethyl) disulfide yield which was 11.3% of the theoretical yield, based on the trithiane charged. In another experiment with thionyl chloride, the yield was 12.8%. With a mixture of sulfur monochloride and thionyl chloride, the bis(chloromethyl) disulfide yield was 9.6%, based on the trithiane charged. With sulfuryl chloride, a 12.6% yield was obtained. According to literature reports, the bis(chloromethyl) disulfide yields which have been obtained from trithiane by other workers have also been low, e. g., on the order of 4% theor. (H. Brintzinger et al., Chem. Ber. (1950) 83, 87–90; W. Davies and A. N. Hambly, Australian J. Chem. (1953) 6, 152–5, C. A. 48, 2584h).

Taking the chlorination of trithiane as described in Example 2 for an exemplary calculation, it will be seen that seven moles of trithiane, each molecule of trithiane consisting of three —CH$_2$S— fragments, can theoretically produce 10.5 moles of bis(chloromethyl) disulfide:

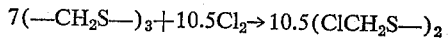

$$7(\text{—CH}_2\text{S—})_3 + 10.5\,\text{Cl}_2 \rightarrow 10.5(\text{ClCH}_2\text{S—})_2$$

Multiplying 10.5 moles by 163, the molecular weight of bis(chloromethyl) disulfide, there is obtained a hypothetical possible yield of 1710 g. of bis(chloromethyl) disulfide. Since the actual isolatable yield of bis(chloromethyl) disulfide is usually, as mentioned above, at most 15% of theoretical, it may be seen that a yield of 1710×0.15=256.5 g. of bis(chloromethyl) disulfide may be obtained, or, translating this to the proportion of distillate, 256.5 divided by 1130.5, the total weight of distillable product, equals 0.23, i. e., about 23%. Thus a 108 g. portion of the distillate would contain 23/100×108=24.8 g. (24.8/163=0.15 mole) of bis(chloromethyl) disulfide.

In Example 8 were described reactions of trimethyl phosphite and triethyl phosphite with the distillate of Example 2. From 108 g. of distillate containing a maximum of 15% bis(chloromethyl) disulfide, there could have been obtained, at best, 0.15×310.2 (mol. wt. tetramethyl (dithiodimethylene)diphosphonate)=46.5 g. of the diphosphonate. The yellow reaction product obtained with 0.5 mole of trimethyl phosphite as described in Example 8 weighed 151.8 g. The reaction product thus could contain 46.5/151.8=about one-third tetramethyl (dithiodimethylene)diphosphonate. Actually, the best yields which have been obtained of this diphosphonate from trimethyl phosphite and pure bis(chloromethyl) disulfide in repeated experiments were 83% of theoretical. The reaction product thus probably contained no more than 0.83×46.5=38.6 g., or 38.6/151.8=about one-fourth by weight tetramethyl (dithiodimethylene)diphosphonate.

Similar calculations for the triethyl phosphite reaction product show the yield of tetraethyl (dithiodimethylene)diphosphonate, if 100% conversion to the diphosphonate were obtained, could be 0.15×366.3=55 g. The product of this reaction as described in Example 8 weighed 172.7 g. It thus could contain 55/172.7=about one-third diphosphonate. The maximum yields that have been obtained of this diphosphonate from pure bis(chloromethyl) disulfide and triethyl phosphite were on the order of 64% of theoretical. The probable tetraethyl (dithiodimethylene) diphosphonate content of this reaction product was thus 0.64×55=35 g., or 35/172.7=0.202, or about one-fifth, by weight.

Evidently, since bis(chloromethyl) disulfide is distillable, and, as shown in Examples 1 to 4, about one-third of the trithiane chlorination product cannot be distilled at temperatures above those at which bis(chloromethyl) disulfide distills under reduced pressure (Example 1, 127.5 g. residue, 246 g. distillable; Example 2, 630 g. residue, 1130.5 g. distillable; Example 3, 129 g. residue, 525 g. distillable; Example 4, 654 g. residue, 2110 g. distillable), the reaction products of the present invention derived from the total trithiane chlorination product must contain proportionately less (dithiodimethylene)diphosphonate ester than those prepared from the trithiane chlorination product distillate. Concomitantly, so far as there is cause to believe, the present reaction products when derived from the distillation residue do not contain (dithiodimethylene)diphosphonate esters at all.

To establish the activity of the present reaction products with respect to their (dithiodimethylene)diphosphonate ester content, parallel tests were run to establish the insecticidal activities of pure (dithiodimethylene)diphosphonate esters and those of the present reaction products. Bis(chloromethyl) disulfide was synthesized and isolated. Substantially pure tetraethyl and tetramethyl (dithiodimethylene)diphosphonates were then prepared from the bis(chloromethyl) disulfide by reaction with phosphites as described in the aforementioned G. Birum application, Serial No. 470,788, filed November 23, 1954. The insecticidal tests on the essentially pure (dithiodimethylene)diphosphonate tetraethyl and tetramethyl esters were repeated at increasing dilutions until the "extinction point" was established, i. e., the concentration beyond which less than 100% kill was obtained. Obviously, if the insecticidal efficiency of the present reaction products were due solely to the (dithiodimethylene)diphosphonate ester content, the "extinction point" of the insecticidal activity of these reaction products would be a proportionate multiple of that of the pure dithiodimethylenediphosphonate ester. Thus, reaction products derived from the trithiane chlorination product distillate and containing at most one-fourth to one-third (dithiodimethylene)diphosphonate ester should have to be employed at three to four times the concentration of the corresponding pure (dithiodimethylene)diphosphonate ester to give the same insecticidal results, if the (dithiodimethylene)diphosphonate ester were the sole active ingredient. As shown in the examples below, it has been found that, on the contrary, the present reaction products give equal or better results at concentrations the same as, or at most twice that of the pure (dithiodimethylene)diphosphonate ester. Application of the present reaction products at twice the concentration of the pure (dithiodimethylene)diphosphonate ester would still be equivalent to applying only one-half to two-thirds as much (dithiodimethylene)-diphosphonate ester, at most, and obtaining the same results, so that it is demonstrated that either active ingredients other than (dithiodimethylene)diphosphonate esters must be present in the reaction products of the invention, or else the reaction products contain synergists for the (dithiodimethylene)diphosphonate esters.

The following examples are illustrative of such experiments:

*Example 13.*—For this example, acetone solutions of the various compounds tested were prepared containing concentrations by weight of the test compounds as shown in the following table. For each test, a drop equivalent to 1.707 microliters was applied to the dorsum of the thorax of each of five fifth instar large milkweed bug nymphs. After treatment, the insects were released within dishes and held twenty-four hours at constant temperature. At the end of that time the mortality observations were made. The following table summarizes the results obtained:

TABLE I.—CONTACT ACTIVITY (*Oncopeltus fasciatus*)

| Percent Concentration | Percent Mortality | | | |
|---|---|---|---|---|
| | 1.0 | 0.25 | 0.125 | 0.063 |
| A. Triethyl phosphite reaction products with: | | | | |
| 1. Substantially pure bis(chloromethyl) disulfide [tetraethyl (dithiodimethylene)-diphosphonate] | 100 | 100 | 100 | 60 |
| 2. Distillate from thionyl chloride chlorination of trithiane (Ex. 8) | 100 | 100 | 100 | 60 |
| 3. Distillate from sulfuryl chloride chlorination of trithiane (Ex. 9) | 100 | 100 | 80 | |
| B. Trimethyl phosphite reaction products with: | | | | |
| 1. Substantially pure bis(chloromethyl) disulfide [tetramethyl (dithiodimethylene)-disphosphonate] | 100 | 100 | 100 | 20 |
| 2. Distillate from thionyl chloride chlorination of trithiane (Ex. 8) | 100 | 100 | 20 | |
| 3. Total sulfuryl chloride-trithiane chlorination product (Ex. 5) | 100 | 100 | 20 | |
| 4. Residue from distillation of sulfuryl chloride-trithiane chlorination product (Ex. 6) | 100 | 100 | 60 | |

It will be seen from this table that the reaction product derived from triethyl phosphite and a trithiane chlorination product distillate made with thionyl chloride gives equally as great a kill as the substantially pure tetraethyl (dithiodimethylene)diphosphonate when each is employed at an 0.063% concentration; although as shown above, the crude trithiane reaction product can contain only 33% or less (dithiodimethylene)diphosphonate ester as an active ingredient. The trithiane-sulfuryl chloride chlorination product distillate reaction product with triethyl phosphite is more effective than the pure tetraethyl (dithiodimethylene)diphosphonate at only twice the concentration, although again, it must contain much less than 50% tetraethyl (dithiodimethylene)diphosphonate. The activities of the triethyl phosphite reaction products are accordingly shown to be greater than would have been predicted from their known (dithiodimethylene)diphosphonate ester contents, and consequently it must be concluded that either a synergistic action is occurring, or else unidentified insecticidally effective products are present in the reaction products of the invention.

Similarly, whereas pure tetramethyl (dithiodimethylene)diphosphonate gives a 20% kill at 0.063%, the crude trithiane chlorination product distillate produces this same mortality at only twice the concentration although it contains much less than 50% tetramethyl (dithiodimethylene)diphosphonate. The total trithiane chlorination reaction product with trimethyl phosphite also produces this activity equivalent to pure tetramethyl (dithiodimethylene)diphosphonate at only twice the concentration, whereas the total trithiane chlorination product on reaction with trimethyl phosphite can contain only much less than one-third, i. e., at most one-fifth, tetramethyl (dithiodimethylene)diphosphonate as an active ingredient and accordingly would have been expected to be far less effective.

It will be noted that the trithiane chlorination product distillation residue reaction product with trimethyl phosphite produces 100% kill at down to 0.25% concentration. As noted above, the distillation residue must be free of bis(chloromethyl) disulfide, and accordingly, the reaction products to which it might owe its activity are unknown.

*Example 14.*—In a similar series of comparative tests, the toxicity of the present compounds to the yellow-fever mosquito larvae (*Aedes aegypti*) was tested. Solutions of the test compound in acetone were prepared and diluted with distilled water containing approximately twenty-five third and fourth instar mosquito larvae, the concentrations being adjusted to produce an 0.001% ($1 \times 10^{-3}\%$) concentration of the test chemicals by weight of the total aqueous suspension. The tests were repeated at increasing dilutions until less than 100% kill was obtained. The results obtained are summarized in the following table.

TABLE II.—CONTACT ACTIVITY (*Aedes aegypti*)

| Percent Concentration | Percent Mortality | | | |
|---|---|---|---|---|
| | $1 \times 10^{-3}$ | $5 \times 10^{-4}$ | $2.5 \times 10^{-4}$ | $6.3 \times 10^{-5}$ |
| A. Triethyl phosphite reaction products with: | | | | |
| 1. Substantially pure bis(chloromethyl) disulfide [tetraethyl (dithiodimethylene)diphosphonate] | 100 | 100 | 64 | |
| 2. Distillate from thionyl chloride chlorination of trithiane (Ex. 8) | 100 | 100 | 100 | 77 |
| 3. Distillate from sulfuryl chloride chlorination of trithiane (Ex. 9) | 100 | 100 | 100 | 92 |
| B. Trimethyl phosphite reaction products with: | | | | |
| 1. Substantially pure bis(chloromethyl) disulfide [tetramethyl (dithiodimethylene)diphosphonate] | 100 | 100 | 72 | |
| 2. Distillate from thionyl chloride chlorination of trithiane (Ex. 8) | 100 | 100 | 96 | |
| 3. Total sulfuryl chloride-trithiane chlorination product (Ex. 5) | 100 | 100 | 92 | |
| 4. Residue from distillation of sulfuryl chloride-trithiane chlorination product (Ex. 6) | 100 | 100 | 96 | |

It will be seen from the above table that the present reaction products in each case give results which are better than those obtained with the pure tetraalkyl (dithiodimethylene)diphosphonate esters, and that the reaction product prepared from trimethyl phosphite and the residue from distillation of the trithiane chlorination product is also found to be an effective toxicant in this test.

*Example 15.*—For this test, acetone solutions of the respective chemicals were prepared containing the designated concentrations of the chemicals. One ml. of the acetone solution was pipetted evenly over the surface of a No. 2 Whatman 9 cm. filter paper sheet and the acetone allowed to evaporate. The treated papers were held for twenty-four hours and then arranged on glass plates. A glass ring was placed on each paper, the inside surface of the ring being coated with a thin film of polyethylene glycol to retain the insects. Ten late second or early third instar large milkweed bug nymphs were placed onto the papers within the rings. The test assemblies were stored at constant temperature for twenty-four hours, after which time mortality observations were made and recorded. Results are reported as percent mortality at the indicated concentrations. The results obtained in this test, which evaluates residual activity such as is obtained with DDT, on a porous, inert surface, are summarized in the following table.

TABLE III.—RESIDUAL ACTIVITY (Oncopeltus fasciatus)

| Percent Concentration | Percent Mortality | | |
|---|---|---|---|
| | 3.0 | 1.0 | 0.5 |
| A. Triethyl phosphite reaction products with: | | | |
| 1. Substantially pure bis(chloromethyl) disulfide [tetraethyl (dithiodimethylene)-diphosphonate] | 100 | 54 | |
| 2. Distillate from theonyl chloride chlorination of trithiane (Ex. 8) | | 100 | 0 |
| 3. Distillate from sulfuryl chloride chlorination of trithiane (Ex. 9) | | 100 | 70 |
| B. Trimethyl phosphite reaction products with: | | | |
| 1. Substantially pure bis(chloromethyl) disulfide [tetramethyl (dithiodimethylene)diphosphonate] | | 0–45 | |
| 2. Residue from distillation of sulfuryl chloride-trithiane chlorination product (Ex. 6) | | 100 | 100 |

Again the effectiveness of the present reaction products is demonstrated.

*Example 16.*—Corroboration of the theory that active ingredients other than (dithiodimethylene) diphosphonate esters are responsible for the activity of the present reaction products is afforded by the tests on systemic action reported below. In this test, plants are allowed to absorb the chemical through excised stems so that a stomach poisoning activity against insects may be produced in the leaves of the plant as a result of translocation and/or metabolism.

Long-cut stems of Wood's prolific Lima bean with cotyledons and cotyledon leaves and cucumber stems with cotyledon leaves were inserted into test tubes containing various concentrations of the chemicals in the form of aqueous emulsions prepared with "Emulsifier L" as an emulsifying agent. "Emulsifier L" is a commercial emulsifier reputed to be a mixture of a polyalkylene glycol ether with a higher alcohol and a long-chained alkyl benzene sulfonate. The test materials were mixed with the emulsifier and then diluted with tap water to prepare the indicated concentrations.

The plant stems were inserted into test tubes containing the emulsions of the chemicals and the test tubes were set in a lighted incubation chamber for 72 hours to absorb the chemical. At the end of this time, the bean leaves were excised with petioles of from two to three inches in length and placed in water-filled test tubes, while the entire cucumber stems were plugged into test tubes. These assemblies were then infested with the test species, the bean leaves being infested with two-spotted spider mite mobile stages (principally adult females), and the cucumber cotyledons being infested with 10 mature wingless agamic cotton aphids. After being held for 48 hours at 77° F., the plants were observed and mortality observations made as shown in the following table.

TABLE IV.—SYSTEMIC ACTIVITY (Tetranychus telarius, Aphis gossypii)

| Percent Concentration | Percent Mortality | |
|---|---|---|
| | 0.004 | 0.002 |
| A. *Tetranychus bimaculatus* (spider mite) Trimethyl phosphite reacted with: | | |
| 1. Substantially pure bis(chloromethyl) disulfide [tetramethyl (dithiodimethylene)-diphosphonate] | 100 | 97 |
| 2. Distillate from thionyl chloride chlorination of trithiane (Ex. 8) | 100 | 25 |
| B. *Aphis gossypii* (aphids) Trimethyl phosphite reacted with: | | |
| 1. Substantially pure bis(chloromethyl) disulfide [tetramethyl (dithiodimethylene)-diphosphonate] | 100 | 40 |
| 2. Distillate from thionyl chloride chlorination of trithiane (Ex. 8) | 80 | 10 |
| 3. Total sulfuryl chloride-trithiane chlorination product (Ex. 5) | 100 | 12 |
| 4. Residue from distillation of sulfuryl chloride-trithiane chlorination product (Ex. 6) | 80 | 10 |

It will be seen that the data reported again confirm the unexpectedly high activity of the present reaction products, and that the product prepared from the chlorination product distillation residue is again shown to be an active insecticide.

*Example 17.*—In this test the contact and residual action of the present reaction products was tested on potted bean plants at varying concentrations. Pots of bean plants previously infested with two-spotted spider mites were sprayed to run-off with emulsions of the reaction products and of the (dithiodimethylene)diphosphonate ester, the emulsions being prepared as described in the above example. The mite infested plants were then placed on constant water level benches and held in the greenhouse for 48 hours. The mortality observations are summarized in the following table, wherein the mortality observations are recorded with respect to toxicity to the mobile stages, the resting stages, and the eggs of the mites. The mite tests were observed again seven days after spraying to note residual activity and egg and resting stage mortality.

TABLE V.—CONTACT ACTIVITY (Tetranychus telarius)

| Percent Concentration | Percent Mortality | | | |
|---|---|---|---|---|
| | 0.0063 | 0.0031 | 0.0016 | |
| Trimethyl phosphite reacted with: | | | | |
| 1. Substantially pure bis(chloromethyl) disulfide [tetramethyl (dithiodimethylene) diphosphonate]. | | 100 | 100 | Mobile Stages. |
| | | 100 | 50 | Resting Stages. |
| | | 100 | 50 | Eggs. |
| | | 98 | 25 | Residual. |
| 2. Distillate from thionyl chloride chlorination of trithiane (Ex. 8). | 100 | 100 | | Mobile Stages. |
| | 100 | 100 | | Resting Stages. |
| | 100 | 98 | | Eggs. |
| | 98 | 50 | | Residual. |
| 3. Total sulfuryl chloride-trithiane chlorination product (Ex. 5). | 100 | | | Mobile Stages. |
| | 100 | | | Resting Stages. |
| | 50 | | | Eggs. |
| | 25 | | | Residual. |

It will be evident from the table that the reaction product of the trithiane chlorination product distillate and trimethyl phosphite is more effective than the pure tetramethyl (dithiodimethylene)diphosphonate when the reaction product is applied at twice the concentration of the pure (dithiodimethylene)diphosphonate ester, although the present reaction product contains one-third or less diphosphonate ester. The reaction product of the total trithiane chlorination product and trimethyl phosphite is somewhat less effective, but still produces somewhat better results than the pure tetramethyl (dithiodimethylene)diphosphonate at four times the concentration of the pure ester, whereas the total trithiane chlorination product must contain only fifteen percent or less bis- (chloromethyl) disulfide and therefore, if the activity were due to the (dithiodimethylene)diphosphonate ester concentration, it should require more than four times as much of this reaction product to produce the same results as the pure tetramethyl (dithiodimethylene)diphosphonate.

The present reaction products are also effective as nematocides. The chlorine-free triethyl phosphite reaction product with the trithiane chlorination product prepared as described in Example 7 was tested against nematodes by applying the following procedure:

*Example 18.*—The reaction product of Example 7 was introduced into an aqueous culture with nematodes of the species *Panagrellus redivivus* in an amount calculated to produce a concentration of 0.1% by weight of said aqueous culture. It is known that a nematode when placed in water flexes its body at a more or less constant rate and that the effect of the nematocide can be estimated reasonably accurately by counting the rate of this flexing action. The motility of the nematodes was observed through a microscope and the number of flexures counted, the effect on the nematode being expressed as a percentage of the normal flexing rate of a control dispersion not containing a nematocidal agent. At the end of twenty-four hours, the flexing rate of the nematodes in the culture which contained the 0.1% concentration of the reaction product of Example 7 was only two percent of that of the nematodes in the control dispersion. Repetition of the test using an 0.01% concentration of the reaction product of Example 7 produced a flexing rate only five percent of that of the control dispersion in twenty-four hours.

Other reaction products prepared in accordance with the present invention which may be used as insecticides and nematocides include the reaction product of the total trithiane chlorination product with sodium diethyl phosphite; the reaction product of the trithiane chlorination product distillation residue with sodium O,O-diamyl phosphorothioite, etc.

The present condensates are generally applied for pesticidal use in the form of sprays or aerosols. Sprays may be prepared by dissolving the condensates in the usual organic solvents, e. g., acetone, hexane, benzene, carbon tetrachloride, kerosene, etc.; but it is preferred to prepare the sprays by incorporating the present reaction products into aqueous emulsions because less of the active ingredients, i. e., the present reaction products, is thus required to give comparable insecticidal efficiency. The emulsions are readily made by adding to the reaction products an emulsifying agent, if desired, first dissolving or suspending the reaction products in an organic solvent immiscible with water, i. e., an "oil," before the addition of the emulsifying agent and then mixing with water to form an emulsion. Because of the very high insecticidal efficiency of the present reaction products, they need be present in the insecticidal emulsion in only very small concentrations, for example, in concentrations of 100 to 10,000 parts per million by weight of the total emulsion. Emulsifying agents which may be employed are those customarily used in the art for the preparation of oil-in-water emulsions, e. g., longchained polyalkylene glycols, long-chained alkyl sulfosuccinates, etc.

The present esters may also be dissolved in liquefied gases such as the fluorochloroethanes or methyl chloride and applied from aerosol bombs containing the solution.

Instead of employing liquids as carriers and diluents, pesticidal dusts comprising the present esters may be prepared by grinding or milling the active reaction products prepared in accordance with this invention with a pulverulent carrier. Kaolin, bentonite, chalk, talc, etc. can be used as carriers. Sulfite waste liquor and other sulfonic acid compounds as well as other wetting and adhesive agents may, if desired, be used as additives, for example, in a composition comprising eighty parts of inert carrier, ten parts of active ingredient (the reaction product of the invention) and ten parts of adhesive or wetting agent additive. Such a wettable powder may be further diluted with inert carrier to produce emulsions containing the powder in a concentration of from 0.1 to one percent.

The present compounds or compositions containing the same may usefully be applied directly to the insects, or they may be applied to the fruit or foliage of plants or other potential hosts in advance of the anticipated infestation.

The present reaction products and particularly those prepared from higher alkyl phosphites can also be employed in lubricating oils and greases as extreme pressure agents, oxidation inhibitors, etc.; as fire-proofing agents and stabilizing agents in plasticizers; in cutting oils, metal drawing compositions, gum solvent compositions, etc.; as flotation agents; as improving agents for hydrocarbon fuels, etc.

While the invention has been described with particular reference to various preferred embodiments thereof, it will be appreciated that numerous modifications and variations are possible without departure from the invention and the invention is not to be limited to any specific embodiment thereof except as defined in the appended claims.

In the present specification and claims it is to be noted that the term "insect" is herein used to include mites and allied classes of arthropods such as spiders, centipedes, etc., as well as true Hexapoda, i. e., six-legged invertebrates.

What is claimed is:

1. The process which comprises contacting a phosphite ester of the formula $(RO)_2PXR'$ where R is selected from the class consisting of alkyl, chloroalkyl and bromoalkyl radicals, R' is selected from the group consisting of R and alkali metals, and X is an atom selected from the class consisting of oxygen and sulfur, with a chlorination product of trithiane where the chlorinating agent is selected from the class consisting of chlorine, sulfur monochloride, sulfur dichloride, thionyl chloride, sulfuryl chloride and mixtures thereof, and the chlorination step is conducted under substantially anhydrous conditions to introduce from one to three moles of chlorine per mole of trithiane into the chlorination product, and thereby forming a phosphorus-containing insecticidal product.

2. The process of claim 1, wherein the total trithiane chlorination product of trithiane is reacted with the phosphite ester.

3. The process which comprises chlorinating trithiane under substantially anhydrous conditions using a chlorinating agent selected from the class consisting of chlorine, sulfur monochloride, sulfur dichloride, thionyl chloride, sulfuryl chloride and mixtures thereof to introduce from one to three moles of chlorine per mole of trithiane into the chlorination product, isolating from the resulting chlorination product the fraction distillable without decomposition at down to about 0.1 mm., and contacting the said distillable fraction with a phosphite ester of the formula $(RO)_2PXR'$ wherein R is selected from the class consisting of alkyl, chloroalkyl and bromoalkyl radicals, R' is selected from the group consisting of R and alkali metals, and X is an atom selected from the class consisting of oxygen and sulfur, and thereby forming a phosphorus-containing insecticidal product.

4. The process which comprises chlorinating trithiane under substantially anhydrous conditions with a chlorinating agent selected from the class consisting of chlorine, sulfur monochloride, sulfur dichloride, thionyl chloride, sulfuryl chloride and mixtures thereof to introduce from one to three moles of chlorine per mole of trithiane into the chlorination product, subjecting the resulting chlorination product to distillation to remove material distillable without decomposition at down to about 0.1 mm., isolating the residue from the said distillation, contacting the said residue with a phosphite ester of the formula $(RO)_2PXR'$ where R is selected from the class consisting of alkyl, chloroalkyl and bromoalkyl radicals, R' is selected from the group consisting of R and alkali metals, and X is an atom selected from the class consisting of oxygen and sulfur, and thereby forming a phosphorus-containing insecticidal product.

5. The process of claim 1, wherein the said phosphite ester is a tri(lower alkyl) phosphite of the formula $(RO)_3P$, where R is a lower alkyl radical.

6. The process of claim 1, wherein the said phosphite ester is a tris(haloalkyl) phosphite of the formula $(RO)_3P$. wherein R represents a halogen-substituted lower alkyl radical.

7. The process of claim 1, wherein the said phosphite ester is an alkali metal salt of a phosphite diester, of the formula $(RO)_2POR'$, wherein R is a lower alkyl radical and R' is an alkali metal.

8. The process of claim 1, wherein the total trithiane chlorination product is reacted with trimethyl phosphite.

9. The process of claim 3, wherein the distillable fraction of the trithiane chlorination product is reacted at below 100° C. with trimethyl phosphite for a period insufficient to produce complete replacement of all chlorine present in the said distillable fraction of the trithiane chlorination product.

10. The process of claim 4, wherein the trithiane chlorination product distillation residue is reacted with trimethyl phosphite.

11. The process of claim 3, wherein the distillable fraction of the trithiane chlorination product is reacted sequentially with trimethyl phosphite, and tris(2-chloroethyl) phosphite, the trimethyl phosphite being added at a temperature below 10° C. until exothermal reaction ceases, and the tris(2-chloroethyl) phosphite subsequently being added at a temperature below 50° C. until exothermal reaction ceases.

12. The process of claim 3, wherein the distillable fraction of the trithiane chlorination product is reacted with sodium diethyl phosphite.

13. The phosphorus-containing insecticidal product produced by the process of claim 1.

14. The phosphorus-containing insecticidal product produced by the process of claim 2.

15. The phosphorus-containing insecticidal product produced by the process of claim 3.

16. The phosphorus-containing insecticidal product produced by the process of claim 4.

17. The phosphorus-containing insecticidal product produced by the process of claim 5.

18. The phosphorus-containing insecticidal product produced by the process of claim 6.

19. The phosphorus-containing insecticidal product produced by the process of claim 7.

20. The phosphorus-containing insecticidal product produced by the process of claim 8.

21. The phosphorus-containing insecticidal product produced by the process of claim 9.

22. The phosphorus-containing insecticidal product produced by the process of claim 10.

23. The phosphorus-containing insecticidal product produced by the process of claim 11.

24. The phosphorus-containing insecticidal product produced by the process of claim 12.

25. An insecticidal composition comprising an inert carrier and as the essential effective ingredient, the phosphorus-containing insecticidal product produced by the process of claim 1.

26. An insecticidal composition comprising an oil-in-water emulsion of the phosphorus-containing insecticidal product produced by the process of claim 1.

27. The method of killing insects which comprises exposing said insects to a toxic quantity of the phosphorus-containing insecticidal product produced by the process of claim 1.

28. The method of killing insects which comprises exposing said insects to a toxic quantity of the phosphorus-containing insecticidal product produced by the process of claim 10.

29. The method of killing insects which comprises treating living plants with at least a quantity sufficient to kill said insects of the phosphorus-containing insecticidal product produced by the process of claim 1.

30. The method of killing insects which comprises treating living plants with at least a quantity sufficient to kill said insects of the phosphorus-containing insecticidal product produced by the process of claim 8.

No references cited.